Patented Nov. 4, 1941

2,261,556

UNITED STATES PATENT OFFICE 2,261,556

MANUFACTURE OF DELUSTERED FILAMENTS AND FILMS

John Thompson Marsh and Frederick Charles Wood, Manchester, England, assignors to Tootal Broadhurst Lee Company Limited, Manchester, England, a British company No Drawing. Application August 4, 1937, Serial No. 157,314. In Great Britain August 7, 1936

3 Claims. (Cl. 106—166)

This invention relates to improvements in delustering and weighting textile materials, films and the like in whole or in part and compositions suitable therefor.

It is known that solutions of urea and formaldehyde or of compounds of urea and formaldehyde in certain molecular ratios, when acidified deposit a white, water-insoluble product in particulate form, probably in the form of a methylene urea, which is quite distinct from the soluble intermediate condensation products, such as methylol urea, or from the well-known synthetic or artificial resin.

Similarly water-insoluble bodies can be made from acetaldehyde and urea or thiourea in presence of acid or from cyanamide or its polymers and formaldehyde in presence of alkali.

The present invention consists in other methods of application of these bodies to rayon, cotton or other cellulosic and non-cellulosic materials at any stage of their manufacture including the application of these compositions to the solutions such as cellulose and its compounds before precipitation or coagulation as, for example, in rayon or film manufacture.

In application Serial No. 93,232 we have described a process of delustering fabrics by precipitating methylene urea, or similar compounds, on the fabric.

According to the present invention we prepare a dispersion of a non-resinous derivative from an aldehyde and urea or ammonium cyanate, thiourea, cyanamide or such like bodies containing a similar nitrogen-carbon grouping, i. e. the grouping NCN. This division or dispersing operation may be carried out by first isolating the water-insoluble derivative and grinding e. g. in a colloid mill in presence or absence of a protective or dispersing agent down to the required fineness or by initiating and completing the formation of the water-insoluble body in the presence of a protective or dispersing agent which assists the dispersing of it as it is formed and also stabilises it. In this latter method of preparation agitation of some kind ensures the formation of fine dispersions and it is found preferable to cool the mixture during the preparation of the dispersion. If desired the dispersion may be passed through an emulsifying or homogenizing machine. Alternatively, methylene-urea or similar body may be dissolved in an appropriate solvent (conc. hydrochloric acid or formic acid in the case of methylene urea) and reprecipitated in finely dispersed particles.

As prepared in any of these ways the dispersed water-insoluble condensation product may be applied alone or together with known fixing, wetting, softening, thickening, stiffening, filling or colouring agents, in textile processing at any stage of the manufacture of the textiles.

As fixing agents, natural and synthetic rubber latices, resins or resin components and intermediate condensation products leading to resins or salts of de-acetylated chitin have been found very suitable. The following examples illustrate some of the applications of the invention:—

Example 1

5 to 25 parts by weight of freshly prepared monomethylol urea and one part of the sodium salt of sulphonated lauryl alcohol are dissolved in 100 parts of water. The solution is cooled and 1 part of tartaric acid dissolved in 3 parts of water is added all at once or in small portions. The solution is agitated continuously or intermittently until the reaction is complete.

500 ccs. of such a suspension (containing say 5% by weight of methylene urea) are mixed with 60 ccs. of sodium hydroxide (Sp. Gr. 1.32) and stirred into 1,400 gms. of a viscose solution containing about 11% of dissolved cellulose so that the final cellulose content is about 8%. This solution is then prepared for spinning in the known way, and is finally converted into delustered films or filaments by coagulation in the usual "spinning bath" containing sulphuric acid, sodium sulphate and glucose. The product is then washed, desulphurised, bleached and finished in the customary manner. By the use of suitable amounts of methylene urea, the weighting effect may be controlled and the luster varied from opalescence to a matt appearance.

The above example relates to a viscose solution but the methylene urea suspension or solution or components can be mixed with other solutions of cellulose or cellulose derivatives.

Example 2

The previously prepared stabilised suspension can be mixed with a solution of cellulose acetate in acetone and a delustered film formed by evaporation.

Example 3

100 gms. methylene urea is dissolved in 200 ccs. hot conc. hydrochloric acid and this solution poured into 1,500–1,800 ccs. water containing about 80 gms. caustic soda at minus 2° C.

The resulting precipitate is filtered and washed and then made up to the required strength of suspension (e. g. 50% solid, 50% water).

To 140 gms. viscose prepared in the usual manner, are added 56 ccs. normal caustic soda and 2 gms. of the 50% suspension of methylene urea prepared as above. It is then filtered and spun into the usual acid coagulating bath. The yarn so produced is washed, desulphurised and bleached and finished in the customary manner. A yarn with considerably diminished luster is produced.

Example 4

To 140 gms. of viscose solution prepared in the usual manner are added 56 ccs. normal sodium hydroxide solution and 1 gm. of methylene urea which has been ground down to a particle size of less than 5 microns. It is then filtered and spun into any of the usual acid coagulating baths. A delustered yarn is produced.

Example 5

5 to 25 parts by weight of freshly prepared monomethylol urea and 1 part of the sodium salt of sulphonated lauryl alcohol are dissolved in 100 parts of water. The solution is cooled and 1 part of tartaric acid dissolved in 3 parts of water is added all at once or in small portions. The solution is agitated continuously or intermittently until the reaction is complete. Instead of monomethylol urea in this example, an equivalent mixture of urea and dimethylolurea may be employed, or an equivalent mixture of methylene bisurea and formaldehyde may be employed.

Alternatively, the initial condensation of urea and formaldehyde to a methanol urea may be carried out in a known manner but in the presence of the protective agent without isolating the solid methanol urea. From this solution after suitable dilution the methylene urea suspension or dispersion is made in the manner described by the addition of acid and agitation.

The suspension so prepared is applied to the textile material in a known manner, the excess liquor being removed by centrifuging, mangling or squeezing. The impregnated material is then dried and a delustered and/or weighted effect produced. The dispersion of a methylene urea may be mixed with dispersions already known for use with textile materials.

It is desirable to add a fixing agent in order to improve the fastness to washing and this fixing agent may also be incorporated in the suspension. We have found suitable fixing agents to be rubber latex (which also has an additional stabilizing action on the dispersion), and various intermediate condensation products capable of forming synthetic resins, e. g. a solution of partial condensate of urea and formaldehyde. A resin may thus be formed within the fibres at the same time as delustering is effected by the emulsion to produce a delustered crease-resisting product.

Example 6

Dissolve 120 gms. urea in 200 cc. neutral 40% formaldehyde solution and dilute the mixture to 1200 cc. with water containing 6 gms. of the product sold under the registered trade mark "Fixanol" (a fatty alkyl pyridinium bromide). Add, with constant stirring and cooling, 12 gms. tartaric acid dissolved in a small quantity of water, or 35 cc. normal hydrochloric acid. Stir continuously and cool in ice until the reaction is complete the white dispersion is then applied to textile material as in Example 1.

Example 7

Allow a mixture of 120 gms. urea with 150 cc. neutral 40% formaldehyde solution and 8 ccs. ammonia (density 0.88) and 20 gms. sodium salt of sulphonated lauryl alcohol to stand for some hours in the cold. Then add 40 ccs. of a 33⅓% solution of tartaric acid and cool the mixture in ice while it is being stirred continuously.

After some hours a thick dispersion of a white methylene-urea is produced (white dispersion A). Meanwhile a mixture of 100 gms. urea, 200 ccs. neutralised 40% formaldehyde solution and 9 ccs. ammonia is made up and refluxed for 3 minutes at the boil and then cooled immediately. (Clear liquid B.)

Mix 30 ccs. of clear liquid B with 70 ccs. of white dispersion A.

Impregnate the fabric to be treated with this mixture, squeeze dry at a temperature below 100° C. and then heat at 140–170° C. for 2 mins. The fabric may then be washed in soap solution and dried.

A delustered crease-resisting fabric is produced.

The loaded or delustered materials show an affinity for acid colouring matters, in addition to the affinity of the main substance for the usual dyes. "Discharge" pattern effects may be produced by the removal of the delustering agent in selected areas by the appropriate solvent, e. g. acid solution.

Pattern effects may also be obtained in the usual way by application of the agents to the textile material in selected portions or areas.

The dispersion may consist of a stabilised dispersion or a mixture of fine particles with a liquid, such as a fixing solution, with which the fabric may be treated. Or the fixing solution may be padded or printed on to the cloth and the dry fine particles applied to the wet cloth, or the dry fine particles may be added to the spinning solution. In all these cases, the preparation of the delusterant is external to the fabric or spinning solution which may be generically termed a solidifiable solution whether cellulosic, cellulose ester or ether or otherwise.

We declare that what we claim is:

1. A cellulosic solution capable of being spun into filaments and having dispersed therein methylene urea.

2. An organic textile filament containing dispersed methylene urea prepared from the solution of claim 1.

3. A process of making a spinning solution as in claim 1 which comprises externally preparing a dispersion of methylene urea stabilised by a protective agent which is not a solvent for methylene urea and mixing said stabilised dispersion with a spinnable cellulosic solution.

JOHN THOMPSON MARSH.
FREDERICK CHARLES WOOD.